UNITED STATES PATENT OFFICE.

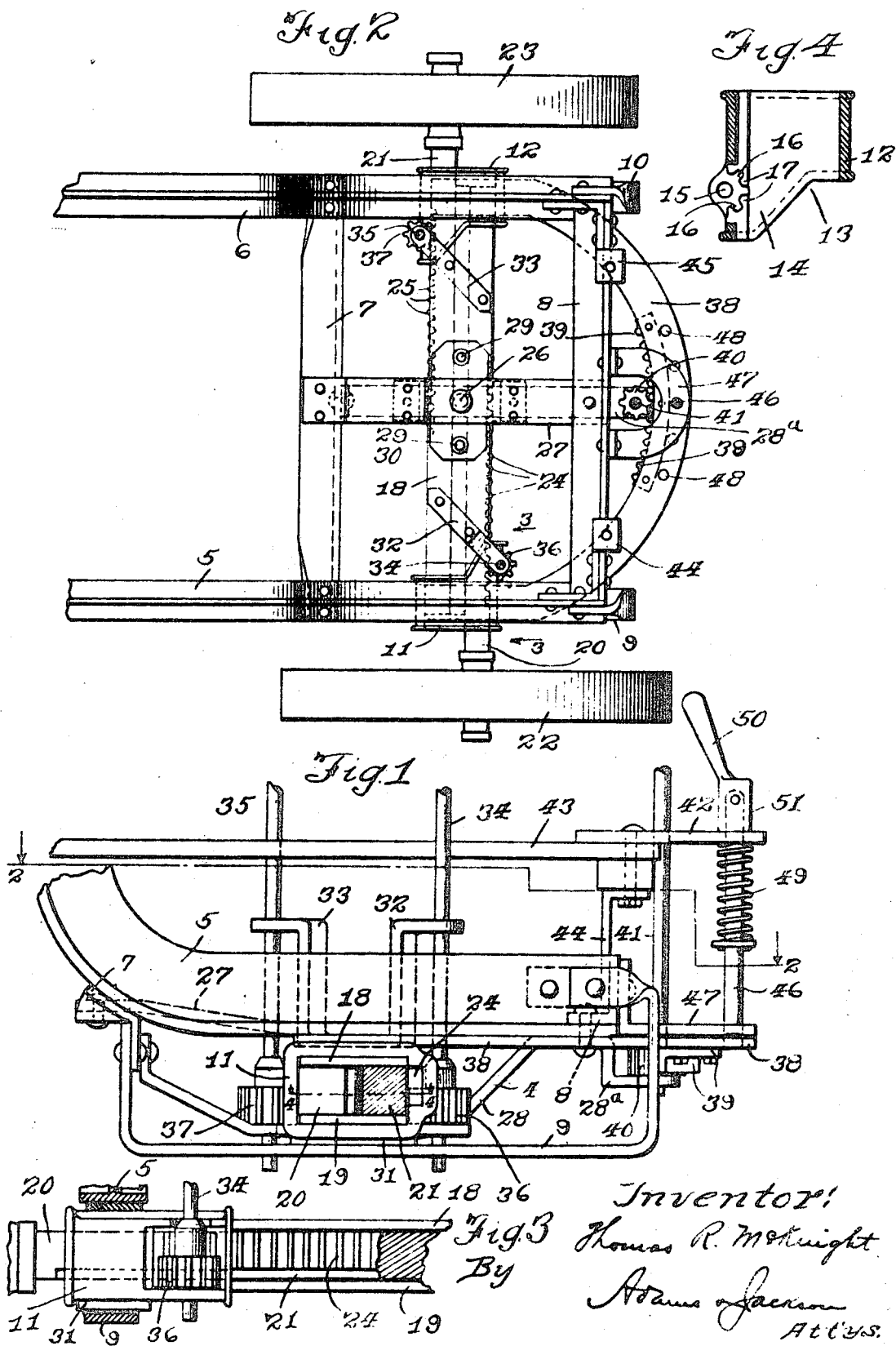

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

VEHICLE-AXLE.

1,306,115.        Specification of Letters Patent.     Patented June 10, 1919.

Application filed June 14, 1915. Serial No. 34,021.

*To all whom it may concern:*

Be it known that I, THOMAS R. McKNIGHT, a citizen of the United States, and a resident of Aurora, in the county of Kane and State of Illinois, have invented certain new and useful Improvements in Vehicle-Axles, of which the following is a specification, reference being had to the accompanying drawings.

My invention relates to vehicle axles, and has for its object to provide an improved pivotal extensible axle especially applicable to grading machines and analogous situations, but which will also be suitable for use on other vehicles. I accomplish this object as illustrated in the drawings and as hereinafter described. That which I believe to be new is set forth in the claims.

In the accompanying drawings, in which I have illustrated my improved axle as applied to a grading machine frame,—

Figure 1 is an enlarged side elevation of the rear portion of a grading machine, one of the axle members being in section, the wheels not being shown;

Fig. 2 is a horizontal section on line 2—2 of Fig. 1;

Fig. 3 is a partial vertical cross-section on line 3—3 of Fig. 2; and

Fig. 4 is a longitudinal section substantially on line 4—4 of Fig. 1, showing one of the sleeves which embrace the axle members and through which they move.

Referring to the drawings,—

5—6 indicate inverted T-bars which constitute the side members or bars of the frame of a grading machine, and are connected by transverse bars 7—8, the latter being preferably angle-irons, as best shown in Fig. 2. 9—10 indicate U-shaped bars or stirrups, which are secured to the rear end portions of the side bars 5—6, which they underlie, as shown in Figs. 1 and 2. These stirrups serve to support sleeves 11—12 which embrace the axle members hereinafter described and through which said axle members move endwise. The preferred shape of the sleeves 11—12 is best shown in Figs. 1 and 4, from which it will be seen that the inner end of each sleeve is cut away at one side, as shown at 13 in Fig. 4, leaving a projecting portion 14 which comprises about one half of the sleeve. At one side of this projecting portion there is a bearing 15, and concentric with such bearing, an indented curved rack comprising a series of notches 16 and teeth 17, so arranged as to be adapted to mesh with the teeth of a pinion to lock the same against rotation. The purpose of this construction will be hereinafter set forth. As shown in Fig. 2, the sleeves 11—12 are inverted with relation to each other, the locking rack carried by the sleeve 11 being nearer the rear end of the machine, while the corresponding locking rack carried by the sleeve 12 is nearer the forward end of the machine. 18—19 indicate upper and lower plates which extend across the machine frame and connect the two sleeves 11—12, their ends lying in the upper and lower portions of said sleeves, as shown in Fig. 1, and being fixedly secured thereto, so that with said sleeves they form an axle frame in which the members of the axle are mounted and in which they slide longitudinally. 20—21 indicate the members of the axle, which are fitted between the plates 18—19, one behind the other, as shown in Figs. 1 and 2. The axle member 20 projects at one side of the machine and carries a wheel 22, and the axle member 21 projects at the other side of the machine and carries a wheel 23. Said axle members have racks 24—25, respectively, along their outer faces, as indicated in dotted lines in Fig. 2. Said racks overlie and register with the hereinbefore-described curved racks carried by the sleeves 11—12.

The axle frame is pivoted centrally to swing about a vertical axis and turn the wheels in one direction or the other,—26 indicating the pivot of said axle frame, which, as best shown in Fig. 2, passes centrally therethrough and is fitted in suitable bearings provided in an upper plate 27 extending longitudinally of the machine at the center thereof, as shown, and connected with the cross-bars 7 and 8, and in a lower plate or brace 28, which is also connected to the cross-bars 7—8. The pivot 26 extends between the axle members 20—21, and preferably rollers 29 are provided at suitable points to hold the axle members in parallel relation to each other and to facilitate their movement when being extended or retracted. 30 indicates a reinforcing plate which is provided centrally upon the upper plate 18, as shown in Fig. 2, and 31 indicates bearing plates, one of which is provided at the under side of each of the sleeves 11—12 between said sleeves and the stirrups 9—10, respectively. When the axle frame is swung about its pivot 26, the plates 31 slide upon their respective stirrups and support the ends of the axle frame in its different positions of adjustment. 32—33 indicate brackets, preferably Z-shaped, which are secured upon the axle frame as shown in Figs. 1 and 2, and provide upper bearings for vertical shafts 34—35, respectively, which carry the usual hand-wheels. The lower ends of said shafts are journaled in the bearings 15 in the sleeves 11—12. The shafts 34—35 carry pinions 36—37 which mesh with the racks 24—25, respectively, and are also adapted to mesh with the curved racks in the sleeves 11—12 hereinbefore described. The shafts 34—35 are movable vertically sufficiently to disengage the pinions 36—37 from the stationary racks in the sleeves without moving them out of mesh with their respective racks 24—25. It will be apparent, therefore, that normally—that is to say, when the shafts 34—35 are in their lowermost positions—they will be locked against rotation by reason of the fact that their respective pinions will be not only in engagement with the racks 24—25, but also with the stationary racks carried by the sleeves 11—12. By raising said shafts slightly, however, they may be disengaged from the stationary racks, and said shafts may then be rotated to extend or retract their respective axle members. Thus, either of the axle members may be extended to any desired position, and then be locked in such position by merely allowing the operating shaft thereof to drop into its normal position.

For the purpose of angularly adjusting the axle frame and the axle members carried by it, said axle frame is provided with a semi-circular bar 38, which extends rearwardly therefrom in a horizontal plane, its forward ends being secured to the sleeves 11—12 at the end portions of the axle frame, and carries a curved rack 39 placed at the rearmost portion of said bar. Said rack is preferably secured to the under side of the bar 38 and is adapted to mesh with a pinion 40 carried at the lower end of an upright shaft or rod 41, as best shown in Figs. 1 and 2. The lower end of said shaft 41 is journaled in a suitable bearing provided in a downwardly-bent portion 28ª of the member 28, as shown in Fig. 1, its upper portion being journaled in a suitable bearing in a rearwardly-projecting bar 42 which is connected to the usual operator's platform 43. 44—45 indicate standards which support said platform at the rear. The wheels are locked in their different positions of angular adjustment by means of a locking-pin 46 which passes through a bearing in the bar 42 and through a bearing in a curved locking-plate 47 which is secured to the cross-bar 8, as shown in Fig. 2. The lower end of said locking-pin is adapted to project into either of a number of holes 48 provided in the curved bar 38, when the desired hole is brought into register with the locking-pin by the swinging of the axle frame. The locking-pin 46 is pressed downward by a spring 49 mounted upon it, as shown in Fig. 1, and is drawn upward into inoperative position by a lever 50 pivoted upon the upper end of said pin above the bar 42 and having a cam 51 adjacent to its pivotal point. The sides of said cam are flattened as shown in Fig. 1, so that when the lever 50 is turned to either of its two positions, it will remain in such position. It will be apparent that by merely swinging the lever 50 in one direction or the other, the axle frame may be locked or unlocked as to rotation about its pivot 26.

By the construction described, either or both of the axle members may be extended or retracted without regard to the angular position of such axle members with reference to the frame of the machine, and the axle frame with the axle members may be angularly adjusted without regard to the extended or retracted position of the wheels. The stirrups 9—10 support the axle members as they are so adjusted, as has been pointed out.

While my improved axle is primarily intended for use on grading machines, it may be employed in other situations, and the claims hereinafter made are therefore to be construed accordingly.

That which I claim as my invention, and desire to secure by Letters Patent, is,—

1. The combination with a main frame, of an extensible axle centrally pivoted to the frame, stirrups depending from the sides of the main frame, sleeves embracing the axle and supported by said stirrups, a curved bar having its ends connected to said sleeves, a rack on said bar, and a shaft mounted on the frame and having a pinion engaging the rack whereby through the curved bar and sleeves the axle may be turned about its pivot.

2. The combination with a main frame, of an axle centrally pivoted to the frame and comprising two parallel members movable relative to each other to vary the length of the axle, a curved bar extending concentric with the pivot of the axle and having at its ends sleeves each loosely surrounding both members of the axle, longitudinally extending guides on the main frame through which said sleeves extend, a rack carried by the curved bar, and a shaft and pinion coöperating with the rack for turning the axle about its pivot.

THOMAS R. McKNIGHT.

Witnesses:
WM. D. FOULKE,
H. A. McKAY.